United States Patent
Binkley

[11] Patent Number: 5,192,466
[45] Date of Patent: Mar. 9, 1993

[54] METHOD OF AND APPARATUS FOR FLOW PROMOTION

[75] Inventor: Michael J. Binkley, Glenn Heights, Tex.

[73] Assignee: Glitsch, Inc., Dallas, Tex.

[21] Appl. No.: 775,299

[22] Filed: Oct. 9, 1991

[51] Int. Cl.[5] .................................................. B01F 3/04
[52] U.S. Cl. ............................ 261/114.3; 261/114.1; 261/114.2
[58] Field of Search ................. 261/114.1, 114.2, 114.3

[56] References Cited

U.S. PATENT DOCUMENTS

| | | | |
|---|---|---|---|
| 1,605,264 | 11/1926 | Millard | 261/114.1 |
| 2,591,343 | 4/1952 | Eld | 261/114.1 |
| 2,787,453 | 4/1957 | Hibshman et al. | |
| 2,880,980 | 4/1959 | Bowles | 261/114.1 |
| 2,951,691 | 9/1960 | Nutter | |
| 3,125,614 | 3/1964 | Mayfield et al. | |
| 3,282,576 | 11/1966 | Bruckert | 261/114.3 |
| 3,410,540 | 11/1968 | Bruckert | |
| 3,550,916 | 12/1970 | Hoppe | |
| 3,759,498 | 9/1973 | Matsch | 261/114.3 |
| 3,784,175 | 1/1974 | Hirao et al. | |
| 4,101,610 | 7/1978 | Kirkpatrick et al. | |
| 4,275,021 | 6/1981 | Kirkpatrick et al. | |
| 4,318,870 | 3/1982 | Haselden | 261/114.1 |
| 4,499,035 | 2/1985 | Kirkpatrick et al. | |
| 4,504,426 | 3/1985 | Chuang et al. | |
| 4,543,219 | 9/1985 | Yamato et al. | |
| 4,550,000 | 10/1985 | Bentham | |
| 4,603,022 | 7/1986 | Yoneda et al. | |
| 4,956,127 | 9/1990 | Binkley et al. | |
| 5,047,179 | 9/1991 | Nye | 261/114.1 |
| 5,049,319 | 9/1991 | Nye | 261/114.1 |

FOREIGN PATENT DOCUMENTS

| | | | |
|---|---|---|---|
| 2227812 | 4/1974 | France | |
| 3314827 | 10/1984 | France | 261/114.1 |
| 510247 | 4/1976 | U.S.S.R. | 261/114.3 |
| 546356 | 2/1977 | U.S.S.R. | 261/114.3 |
| 2092175A | 8/1982 | United Kingdom | |

OTHER PUBLICATIONS

Soviet Inventions Illustrated 17564B Apr. 1979.

Primary Examiner—Tim Miles
Attorney, Agent, or Firm—Johnson & Gibbs

[57] ABSTRACT

Method of and apparatus for imparting directional liquid flow on a chemical process tower tray. A series of raised tray areas are disposed about the tray surface for affecting preferential vapor flow therethrough. The raised tray regions are constructed with directional flow louvers for creating a directional vapor flow, which vapor flow imparts a directional flow vector to the liquid flowing thereacross. In this manner, regions of the tray which may be subject to stagnation from retrograde flow manifest directionalized flow for maximizing tray efficiency and vapor liquid interaction.

25 Claims, 2 Drawing Sheets

METHOD OF AND APPARATUS FOR FLOW PROMOTION

BACKGROUND OF THE INVENTION

1. Field of the Invention

The present invention relates to chemical process towers and, more particularly, to vapor flow panels for achieving preferential liquid flow across the trays of such towers.

2. History of the Prior Art

Distillation columns are utilized to separate selected components from a multicomponent stream. Generally, such gas-liquid contact columns utilize either trays, packing or combinations thereof. In recent years the trend has been to replace the so-called "bubble caps" by sieve and valve trays in most tray column designs, and the popularity of packed columns, either random (dumped) or structured packing have been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high efficiency packing, has also become popular for certain applications. Such packing is energy efficient because it has low pressure drop and low liquid hold-up. However, these very properties at times make columns equipped with structured packing difficult to operate in a stable, consistent manner. Moreover, many applications simply require the use of trays.

Fractionation column trays generally come in two configurations: cross-flow and counter flow. The trays usually consist of a solid tray or deck having a plurality of apertures and are installed on support rings within the tower. In cross-flow trays, vapor ascends through the apertures and contacts the liquid moving across the tray; through the "active" area thereof; in this area liquid and vapor mix and fractionation occurs. The liquid is directed onto the tray by means of a vertical channel from the tray above. This channel is referred to as the Inlet Downcomer. The liquid moves across the tray and exits through a similar channel referred to as the Exit Downcomer. The location of the downcomers determines the flow pattern of the liquid. If there are two Inlet Downcomers and the liquid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) liquid rate increases. It is the active area of the tray, however, which is of critical concern.

Not all areas of a tray are active for vapor-liquid contact. For example, the area under the Inlet Downcomer is generally a solid region. To attempt to gain more area of the tray for vapor-liquid contact, the downcomers are often sloped. The maximum vapor-liquid handling capacity of the tray generally increases with an increase in the active or Bubbling Area. There is, however, a limit as to how far one can slope the downcomer(s) in order to increase the Bubbling Area otherwise the channel will become too small. This can restrict the flow of the liquid and/or restrict the disengagement of vapor retained in the liquid, cause liquid to back up in the downcomer, and thus prematurely limit the normal maximum vapor-liquid handling capacity of the tray.

A variation for increasing the Bubbling Area and hence vapor-liquid handling capacity is a Multiple Downcomer (MD) tray. There is usually a plurality of box shaped vertical channels installed in a symmetrical pattern across the tray to direct liquid onto and off of the tray. The downcomers do not extend all the way to the tray below but stop short of the tray by a predetermined distance which is limited by a sufficient space to permit disengagement of any vapor retained in the liquid entering the Exit Downcomer. The downcomer pattern is rotated 90 degrees between successive trays. The bottom of the boxes is solid except for slots that direct the liquid onto the Bubbling Area of the tray below, in between the outlet downcomers and said tray. The MD tray falls into the category of Multipass Trays and is usually used for high liquid rates.

Addressing now select cross flow plate designs, a particularly effective tray in process columns is the sieve tray. This tray is constructed with a large number of apertures formed in the bottom surface. The apertures permit the ascending vapor to flow into direct engagement with the liquid that is flowing across the tray from the downcomer described above. When there is sufficient vapor flow upwardly through the tray, the liquid is prevented from running downwardly through the apertures (referred to as "weeping"). A small degree of weeping is normal in trays while a larger degree of weeping is detrimental to the capacity and efficiency of a tray.

The capacity of a tray is a function of the open area of holes and of tray spacing. When spacing is fixed, capacity may be increased by increasing the percent open area, but this practice is limited by decreased turndown due to weeping at low vapor rates. To overcome such weeping, a tray has been developed which is constructed from closely spaced rods of trapezoidal cross-section. They are manufactured and sold by the assignee of the present invention under the trademark SCREEN TRAY.

The trapezoidal wire members of the SCREEN TRAY are tapered upwardly, and this creates a Venturi effect to ascending vapor. Surface tension effects become pronounced with such close wire spacing. Combined with the Venturi effect produced by vapor rising through the tapered throats between the wires, surface tension phenomena reduce weeping significantly at low liquid rates and keep spray height low. The upward taper also defines a larger surface area for liquid flowing across the tray.

Tray efficiency is also known to be improved in sieve type trays by increasing the froth height of the liquid and reducing the backflow of the liquid flowing across the tray. Froth is created when vapor bubbles percolate upwardly through the liquid flowing across the tray. The suspension of the vapor in the liquid prolongs the vapor liquid contact which enhances the efficiency of the process. The longer the froth is maintained and the higher the froth is established, the greater the vapor liquid retention. Higher froth requires smaller vapor bubbles and the formation of the bubbles at a sufficiently slow rate. Likewise, backflow occurs beneath the froth when circulating currents of liquid are established during the liquid flow across the plate. This generally forms along the lateral portions thereof. These currents carry liquid back across the tray in a manner that reduces the concentration-difference driving force for mass transfer. It is the concentration-difference between the vapor and the liquid which enhances the effectiveness of the vapor-liquid contact.

The technology of gas-liquid contact is also represented in numerous prior art patents addressing process columns. These include U.S. Pat. Nos. 3,959,419, 4,604,247 and 4,597,916, each assigned to the assignee of the present invention and U.S. Pat. No. 4,603,022 issued to Mitsubishi Jukogyo Kabushiki Kaisha of Tokyo, Japan. A particularly relevant reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating vapor ascension therethrough.

U.S. Pat. No. 4,550,000 assigned to Shell Oil Company teaches apparatus for contacting a liquid with a gas in a relationship between vertically stacked trays in a tower. The apertures in a given tray are provided for the passage of gas in a manner less hampered by liquid coming from a discharge means of the next upper tray. Such advantages improve tray efficiency within the confines of prior art structures. Likewise, U.S. Pat. No. 4,543,219 assigned to Nippon Kayaku Kabushiki Kaisha of Tokyo, Japan teaches a baffle tray tower. The operational parameters of high gas-liquid contact efficiency and the need for low pressure loss are set forth. Such references are useful in illustrating the need for high efficiency vapor liquid contact in tray process towers. U.S. Pat. No. 4,504,426 issued to Carl T. Chuang et. al. and assigned to Atomic Energy of Canada Limited is yet another example of gas-liquid contacting apparatus. This reference likewise teaches the multitude of advantages in improving efficiency in fractionation and modifications in downcomer-tray designs. The perforated area of the tray is extended beneath the downcomer with between 0 to 25% less perforation area.

Yet another reference is seen in U.S. Pat. No. 3,410,540 issued to W. Bruckert in 1968. A downcomer outlet baffle is therein shown to control the discharge of liquid therefrom. The baffle may include either a static seal or dynamic seal. In this regard the openings from the downcomer are sufficiently small to control discharge and may be larger than the tray perforations and of circular or rectangular shape. The transient forces which may disrupt the operation of a downcomer are also more fully elaborated therein. These forces and related vapor-liquid flow problems must be considered for each application in which a downcomer feeds an underlying tray.

The control of flow of liquid and vapor in a chemical process tower has also been addressed by both louvers presented on, and raised areas formed in, select portions of the tray. For example, U.S. Pat. No. 4,956,127 assigned to the assignee of the present invention addresses a raised active inlet area disposed beneath the downcomer of a chemical process tower tray for giving preferential vapor flow to ascending vapor therebeneath, which ascending vapor flow directly engages the descending liquid coming from the downcomer. In this manner, an advantageous and controlled vapor liquid interface is provided. The preferential vapor flow is afforded by virtue of the raised active inlet area, which raised active inlet area comprises a portion of the tray itself and which raised area presents a liquid head thereabove of reduced height to thereby present a lower pressure to the vapor attempting to flow therethrough. The concept of preferential vapor flow through a raised area is not, however, seen only in the aforesaid '127 patent. A raised active area is also set forth and shown in U.S. Pat. No. 4,275,021 assigned to Union Carbide Corporation. In this reference, a raised region is disposed immediately outwardly of the downcomer to present a bubble promoter or froth initiator relative to liquid discharged therefrom. Because the bubble promoter comprises a raised portion of the tray deck itself, the vapor flow will have a preference therethrough relative to adjacent apertures in the tray surface. It may be seen in this reference that adjacent apertures in this particular tray surface may also include louvered regions for directing the flow of vapor across the active area of the tray. These louvered regions comprise apertured portion of the tray deck area and do not comprise raised portions thereof. For this reason, there is no preferential vapor flow through such louvers although directionality of the liquid flow thereacross is manifest therefrom. Likewise, U.S. Pat. No. 4,101,610 illustrates yet another aspect of this invention. It may thus be seen that considerable prior art design activity has focused on the aspect of flow of liquid across active tray regions.

It would be an advantage to provide a tray assembly which promotes uniform liquid flow thereacross as well as increased efficiency. Such a tray is provided in the present invention wherein a series of raised flow promoter panels are positioned around the tray. The panels have a plurality of directional apertures for providing vapor injection into the liquid flow which is effective in achieving greater mass transfer. Likewise one aspect of the assembly incorporating directional apertures effects the liquid flow by limiting the retrograde flow (backmixing) in cross-flow plate applications. Reduced backmixing increases efficiency and homogeneity is maintained across the tray.

SUMMARY OF THE INVENTION

The present invention pertains to an improved tray assembly for a process column. More particularly, one aspect of the invention includes an improved tray assembly for a process column of the type wherein liquid flows downwardly through a first downcomer onto a first tray and across the active area thereof. Across this active area vapor flows upwardly for interaction and mass transfer with the liquid. The liquid then passes from the tray through a second downcomer. The improvement of the present invention comprises a series of raised, flow promoter panel areas disposed around the tray for establishing preferential, directional vapor flow between the inlet and outlet downcomers.

In another aspect, the invention comprises an improved tray of a chemical process tower of the type wherein liquid and vapor flow across and through trays disposed within the tower in substantially counter-current (including cross current) directions. The improvement of the present invention comprises the trays being formed with raised flow promoter panel areas for promoting the flow of liquid thereacross in select directions. The raised panels are disposed in both intermediate and in peripheral regions of the tray to thereby discharge vapor in a select direction for facilitating the most efficient flow direction of liquid therein. The raised panel sections are further formed of a substantially uniform height and are disposed upwardly from the tray surface to themselves comprise an upstanding portion of the tray to afford preferential vapor flow therethrough.

In yet a further aspect, the present invention includes the above described tray of a chemical process tower wherein the flow promoting panels are disposed in opposite lateral portions of the tray for preventing retrograde flow therein. The tray is further constructed with a raised active inlet area disposed beneath a downcomer for carrying liquid from a tray disposed thereabove. In one embodiment, the raised flow promoter panel has a height above the tray surface less than the height of the raised active inlet area. The flow promoter panels may also be constructed with a plurality of flow vanes formed therein, the vanes being adapted for imparting a directional vapor flow therefrom. The vapor flow angle is selected for preventing retrograde liquid flow thereabove.

In yet another aspect, the above described chemical process tower includes the tray being constructed with at least one flow promoter region disposed centrally thereacross, the flow promoter region being constructed in the form of a band disposed across the tray generally perpendicular to the flow of liquid thereon. The raised band may be constructed of a substantially uniformly raised active area. Additionally, the band is constructed with a plurality of louvered apertures formed therein, the louvers imparting directional vapor flow therefrom for engaging the liquid thereabove and imparting a selected flow direction thereto.

In yet a further aspect, the present invention comprises an improved method of controlling the flow of liquid across a tray in a chemical process tower of the type wherein vapor and liquid are forced to flow in generally counter-current (including cross current) passage therethrough. The improved method comprises the steps of constructing the tray with a plurality of raised panel sections and forming the raised panel sections with a plurality of directional flow apertures. The directional flow apertures are constructed along a substantially uniformly raised panel surface and the raised panel surfaces are secured in peripheral regions of the tray. With the raised panel surfaces disposed in these portions of the tray, vapor is permitted to flow upwardly through the tray and preferentially through the raised panel sections while liquid flows across the tray. The preferential flow of vapor through the raised panel sections imparts uniform liquid flow thereabove.

In another aspect, the above described method includes the steps of disposing the flow promoting panels in opposite lateral portions of the tray for preventing retrograde flow. The tray may also be constructed with a raised active inlet area disposed beneath a downcomer for carrying liquid from a tray disposed thereabove. The raised flow promoter panel may include a height above the tray surface less than the height of the raised active inlet area. The flow promoter panels may also be constructed with a plurality of flow vanes formed therein, the vanes being adapted for imparting a directional vapor flow therefrom and the vapor flow angle from the vanes being selected for preventing retrograde liquid flow thereabove.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
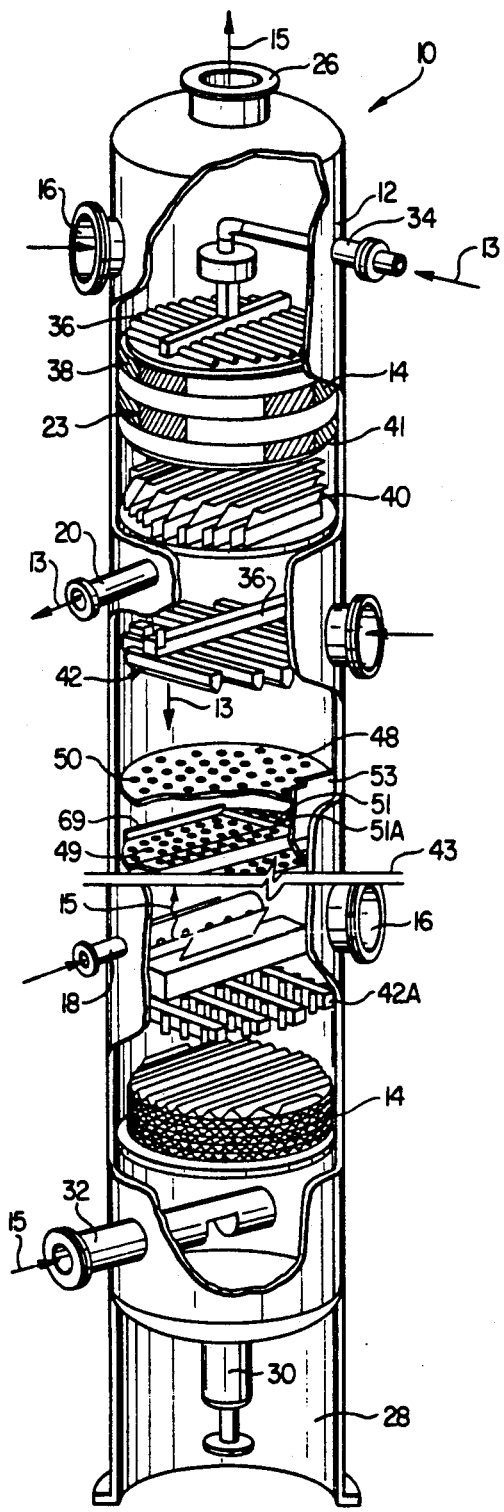
FIG. 1 is a perspective view of a packed column with various sections cut away for illustrating a variety of tower internals and one embodiment of a tray assembly constructed in accordance with the principles of the present invention disposed therein.

Referring first to FIG. 1, there is shown a fragmentary, perspective view of an illustrative packed exchange tower or column with various sections cut away for showing a variety of tower internals and the utilization of one embodiment of the improved high capacity tray assembly of the present invention. The exchange column 10 of FIG. 1 comprises a cylindrical tower 12 having a plurality of packing bed layers 14 and trays disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the trays and packing beds, and is enriched or added to by material which condenses into it out of the vapor stream.

Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the trays and/or packing layers 14. Reflux from condensers is provided in the upper tower region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing 38 A liquid distributor 42, adapted for redistributing liquid 13, is likewise disposed there-beneath. A second type of distributor 42A is shown below the cut-line 43 and disposed above bed 14. The column 10 is presented with cut-line 43 for illustrating the fact that the tower internals arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Such trays comprise plates which are perforated or slotted in construction. The vapor and the liquid engage at or along the tray and, in some assemblies, are permitted to flow through the same openings in a counter-current flow arrangement. Optimally, the vapor and liquid flows reach a level of stability. With the utilization of downcomers, to be described in more detail below, this stability may be achieved with a relatively low flow rate permitting the ascending vapor to mix with the descending liquid. In some embodiments no downcomers are used and the vapor and the liquid use the same openings, alternating as the respective pressures change. But such is not the case herein.

In the present embodiment, cross-flow valve trays 48 and 49 and downcomers 53 and 69 are illustrated. Tray 48 is of conventional design manifesting an array of valves mounted in the surface 50. Tray 49, however, is a valve tray constructed in accordance with the principles of the present invention and includes raised sections 51 around the peripheral sections thereof. In accordance with the present embodiment of the invention, the raised sections 51 are substantially planar and formed with a plurality of directional flow apertures. The directional apertures may comprise directional flow vanes 51A, as will be described below; the design of which is the result of a myriad of critical design considerations. The design considerations include liquid-vapor ratios, liquid cooling, liquid flow/back-mixing, froth uniformity and the presence of solids or slurries therein. Corrosion is likewise a consideration of the various elements in the packed towers and the selection of the material, design, and the fabrication of the tower internal is, in many instances, the result of such considerations. The anatomy of process columns as shown in FIG. 1 is likewise described in more detail in an article by Gilbert Chen, entitled "Packed Column Internals" appearing in the Mar. 5, 1984 edition of *Chemical Engineering*, incorporated herein by reference.

Figure 2:
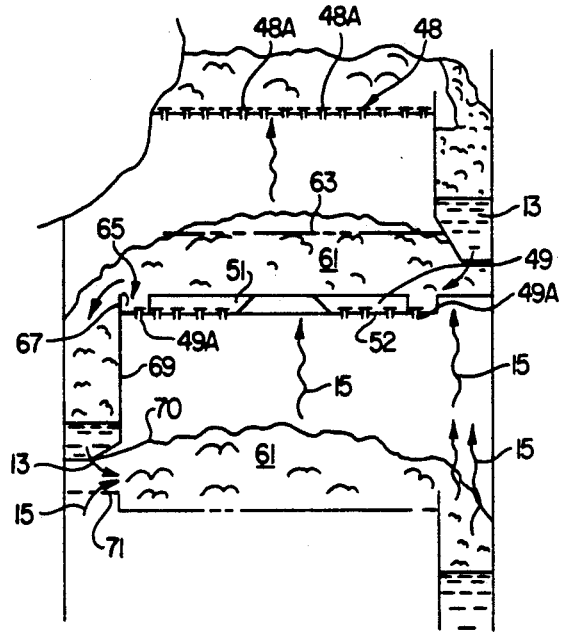
FIG. 2 is a diagrammatic, side elevational, cross sectional view of the improved tray assembly of the present invention secured within a process tower and illustrating the flow of liquid and vapor thereacross.

Referring now to FIG. 2, there is shown a side elevational, cross sectional, diagrammatic view of one aspect of the present invention incorporated into tray 49. The upper valve tray 48 comprises a generally planar panel, within which is mounted an array of valves 48A. The lower tray 49 is also of generally planar construction across its central active area 52 having mounted therein an array of valves 49A. A raised peripheral section 51 is also seen disposed adjacent and above the valves 49A. As discussed below, the raised section 51 imparts a select flow to the liquid passing over tray 49. In this particular embodiment, a raised active inlet area is also provided and the liquid 13 engages vapor 15 discharged from the raised active inlet panel, which may be of the type set forth and shown in copending patent application Ser. No. 490,778, abandoned in favor of application Ser. No. 725,365, filed Jun. 6, 1991 and now U.S. Pat. No. 5,106,556. A series of raised panel sections 51 (not shown) may also be used to further enhance the flow of vapor and liquid across the active region 52 of tray 49. The remaining ascending vapor 15 passes through the plurality of valves 49A of the active region and creates a froth 61. The froth or "foam" is a region of aeration in which the phase of the liquid 13 is continuous. When the froth 61 does not exist or becomes discontinuous, an inversion to a gas-continuous regime can result in a "spray" of gas upwardly therethrough. These are engineering design considerations.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into a discharge region 70 where the liquid accumulates and disperses upon inlet region 71 therebeneath. In one embodiment, the inlet region is both uniformly raised and active as shown in U.S. Pat. No. 4,956,127, assigned to the assignee of the present invention.

Referring still to FIG. 2, the area of valves for a single cross-flow plate establishes the active length of the plate and the zone in which the froth 61 is established. The raised panel areas 51 increase the total active area, as will be discussed below, and by increasing the total active area by the peripheral raised panel areas 51, greater capacity and efficiency is achieved. The manner of flow of the liquid 13 across the tray 49 is, in the present embodiment, critical to tray efficiency. A flow diagram of a conventional tray will be discussed below for purposes of illustrating the efficiency afforded by the present invention.

Figure 3:
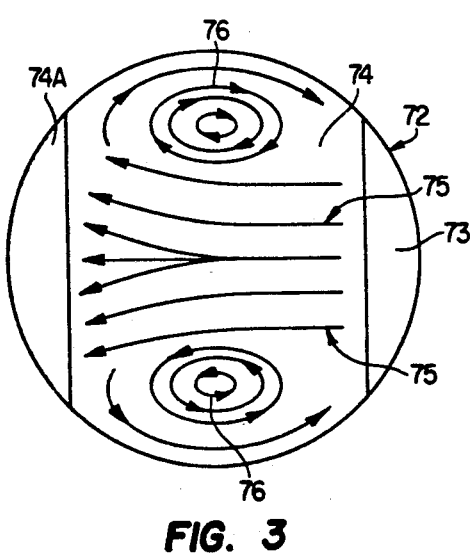
FIG. 3 is a top plan, diagrammatic view of a prior art sieve plate illustrating conventional problems with liquid flow thereacross.

Referring now to FIG. 3, there is shown a flow diagram across a conventional, prior art tray. The prior art tray 72 is illustrated herein as a round tray having a first conventional downcomer for feeding liquid upon a solid, underlying panel 73 and then to the active tray region 74. A second downcomer 74A carries liquid away from the tray. A plurality of arrows 75 illustrate the non-uniform flow of liquid 13 across the conventional active area. Recirculation cells 76 are shown to be formed on both sides of the tray lateral to the direction of flow. The formation of these retrograde flow areas, or recirculation cells, decreases the efficiency of the tray. These recirculation cells are the result of retrograde flow near the walls of the process column and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration difference driving force will result in more contact or height requirement for a given separation in the column. Although back mixing is but a single aspect of plate efficiency, the reduction thereof is provided concurrently with the other advantages hereof.

Figure 4:
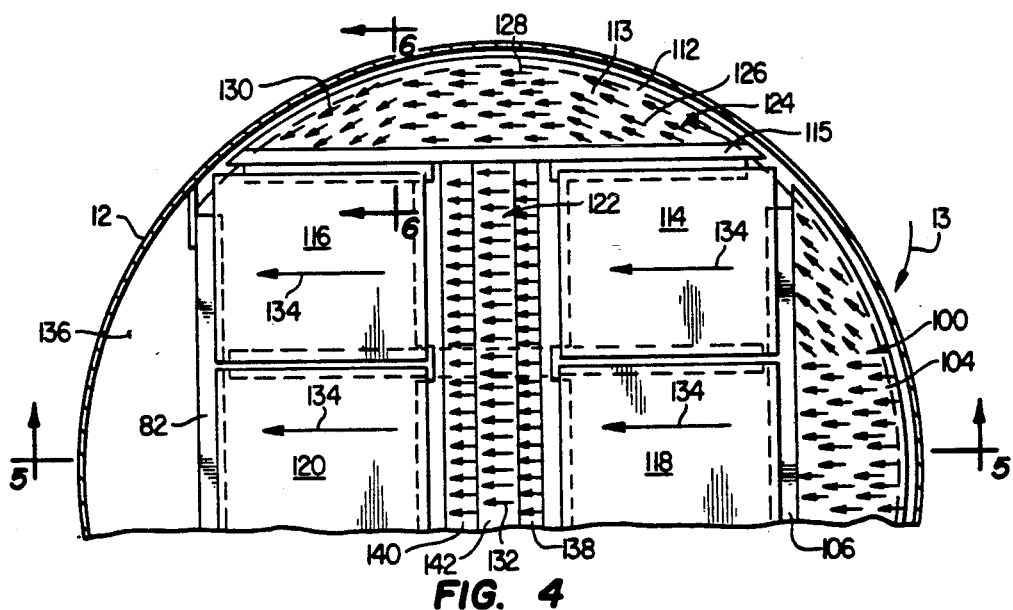
FIG. 4 is an enlarged, top plan view of the tray assembly of the present invention with a portion cut away for clarity.

Referring now to FIG. 4, there is shown an enlarged, fragmentary top plan view of a tray assembly 100 constructed in accordance with the principles of the present invention. The tray 100 as shown herein is constructed for placement in the tower 12 whereby a feeding downcomer can be disposed over an inlet region 104 for providing liquid 13 to tray 100. A weir 82 is disposed on the opposite side of tray 100 whereby a second downcomer is disposed for carrying froth and liquid away from the tray 100. Liquid 13 spills down upon active inlet panel 104 and over upstanding edge 106 onto the tray deck. The liquid 13 then flows across the tray in a select fashion in accordance with the principles of the present invention as hereinafter described.

Still referring to FIG. 4, there is shown an enlarged, top plan view of a tray 100 constructed in accordance with the principles of the present invention and illustrating the placement of a raised active chordal, panel section 112 along a peripheral portion thereof relative to the inlet area 104. Raised panel section 112 is constructed with a plurality of directional flow vanes formed in a generally planar deck 113. A tapering inside rim portion 115 is disposed between the raised panel and the lower active area of the tray 100. The lower active area of the tray includes a plurality of discrete active area sections in panels 114, 116, 118 and 120. The sections may be constructed with a variety of conventional openings such as bubble caps, valves, elongate slits, round holes and the like. Conventional holes disposed on panels 114, 116, 118 and 120 will be affected by the peripheral flow occurring over raised panel 112 as well as by an intermediate raised section, or band 122, which likewise is constructed with a plurality of flow vanes for providing preferential vapor flow therethrough to impart select directionality to the liquid flowing thereover. In this regard, the flow vanes formed in the deck 113 of raised panel section 112 are representatively shown by the arrows 124 disposed thereon. Arrows 124 represent the general direction of liquid flow imparted by the flow vanes constructed therein, and one embodiment of such a flow vane is discussed below.

Still referring to FIG. 4, three flow directions are shown in panel 112 comprising arrows 126 vectoring outwardly from inlet panel 114 and into diametral streamline arrows 128. The diametral streamline is the direct liquid flow path from the tray inlet to the outlet downcomer, which path is disposed substantially along the column diameter. This is indicated by the phantom line labeled 201 in FIG. 7. The diametral streamline arrows 128 are those arrows which are parallel to the diametral streamline. Arrows 128 engage arrows 130 which are angled toward downcomer 136.

As further seen in FIG. 4, a raised flow promoter band 122 is disposed across the tray deck to further control the liquid flow. The preferred direction of flow of the liquid 13 over the tray sections 114, 116, 118 and 120 is preferably parallel to the diametral streamline as indicated by arrows 134. It should be noted that arrows 134 are generally parallel to diametral streamline arrows 128, as are the arrows 132 of band 122. These arrows represent the preferred direction of flow, as imparted by flow vanes disposed in the flow promoter panels, and provide maximum flow efficiency. It should be noted that the band 122 is optional in this particular embodiment and includes a top surface 142 disposed between a rear angulated surface 140 and a forward angulated surface 138, which construction will be described in more detail below.

Figure 5:
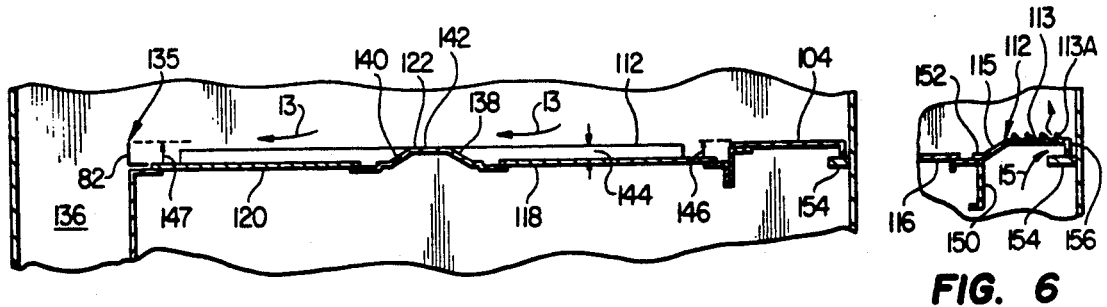
FIG. 5 is an enlarged, side elevational, cross sectional view of raised tray area taken along lines 5—5 of FIG. 4.

Referring now to FIG. 5, there is shown a fragmentary, side elevational, cross sectional view of the tray of FIG. 4 taken along lines 5—5 thereof. In this view, the raised panel 112 is seen to be secured above the conventional tray deck height established by the surface of tray sections 120 and 118. Panel 112 is seen to lie above tray 118 a distance represented by arrow 144. Likewise the raised active inlet panel 104 is raised above the tray deck surface 118 a distance as represented by arrow 146. Height 146 is greater than height 144. Because panel area 104 is higher than the panel 112, a higher vapor flow preference is afforded. Likewise, discharge downcomer weir 82 has a top surface 135 which is higher than the top surface of panel area 104, as indicated by arrow 147. The higher discharge weir 82 promotes proper liquid flow from raised panel 104.

Still referring to FIG. 5, it may be seen that the band 122 is constructed in this particular embodiment in a roof like configuration, with top 142 disposed between two slanted portions 140 and 138. This contour is representatively shown in FIG. 4 above. The slanted portions 138 and 140 provide structural mounting of the planar flow vane region 142 as well as a gradual taper to facilitate flow of liquid 13. The slant of regions 138 and 140 thus reduces turbulence of the liquid flow 13 while facilitating its passage over the flow promotion region 142.

Figure 6:
FIG. 6 is an enlarged, side elevational view of a peripheral region of the tray assembly of FIG. 4 taken along lines 6—6 thereof.

Referring now to FIG. 6, there is shown a side elevational, cross sectional view of a section of the raised panel 112 of FIG. 4, taken along lines 6—6 thereof. The panel 112 is shown to be mounted above a mounting truss 150 and an outer structural tower ring 154. The top surface comprising plate 113 includes a depending outer portion, or lip 156 which rests upon the tower support ring 154. Likewise the tapering edge 115 includes an outwardly extending lip 152 which rests upon the support truss 150 adjacent the panel 116. Ascending vapor 15 is thus afforded a preferential flow through the raised panel deck 113 for discharge therefrom through the angulated louvers discussed below.

Still referring to FIG. 6, it may be seen that the top surface of plate 113 is disposed upwardly from the underlying tower support ring 154. The support ring 154 would ordinarily flushly engage any portion of a tower tray contiguous thereto. In the present embodiment, the tower tray surface 113 is disposed above the support ring and any apertures, such as aperture 113A disposed vertically above the tower ring 154, are open to receive the flow of vapor 15 therethrough. Vapor flow would ordinarily be sealed off from such an aperture disposed against the width of the tower ring 154. Because the tower ring may support the entire circumferential region of the tray, its engagement of this tray edge portion can effectively eliminate a substantial percentage of potential active tray area. In the present invention, this potential active area is activated and is exposed to vapor flow. Thus, the configuration of the peripheral flow promoter panels 112 further facilitate efficiency of the tower by effectively increasing the active tray area thereof as well as by providing flow promoter vanes 113A therein.

Figure 7:
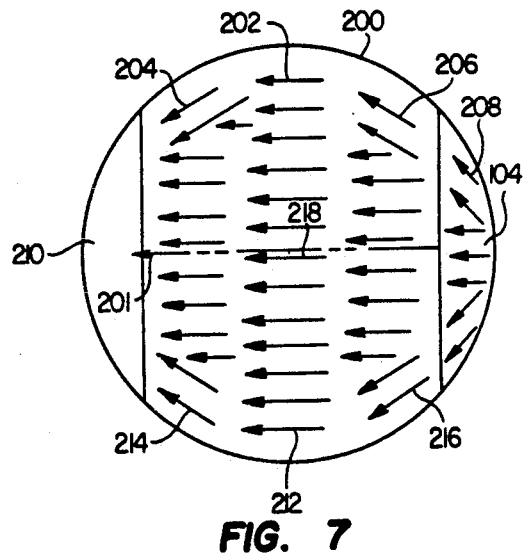
FIG. 7 is a diagrammatic, top plan view of the promoted liquid flow across the tray assembly of FIG. 4.

Referring now to FIG. 7, there is shown a top plan diagrammatic view of the tray of FIG. 4 illustrating a preferred flow pattern from an inlet 104 to a discharge downcomer 210 and the above referenced diametral streamline 201. The diagrammatic tray 200 is thus constructed with a plurality of arrows illustrating the preferred liquid flow which may be imparted by virtue of the raised panel flow promoters described herein. The arrow 202 represents the preferred direction of flow of liquid across the outer perimeter regions often subject to retrograde flow. This direction is parallel to the diametral streamline 201. Arrow 204 represents the direction of induced flow toward the diametral streamline 201 by virtue of the flow promoter as does arrow 206 directing fluid flow outwardly from the inlet 104 and streamline 201. Arrows 208 represent the induced flow of liquid and vapor from the raised active inlet area 104 described above. The flow of liquid thus proceeds in the indicated pattern across the active tray area to the downcomer 210. Likewise the opposite side of the tray 200 is similarly constructed for inducing a complemental flow pattern as represented by arrows 212, 214 and 216 in parity with arrows 202, 204 and 206, respectively. Arrow 218 in the intermediate portion of the tray is positioned adjacent the diametral streamline 201, and thus represents the effective flow of fluid proceeding from the inlet area to the downcomer 210 in a preferred flow pattern. Various intermediate flow promoters may be used to maintain the uniformity of this flow, such as the flow promoter band 122 of FIG. 4.

Figure 8:
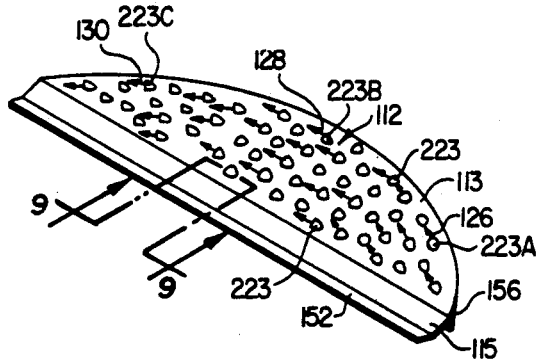
FIG. 8 is an enlarged, perspective view of the peripheral flow promoter panel of FIG. 4 illustrating the configuration of one embodiment of a flow promoter louver formed therein.

Referring now to FIG. 8, there is shown an enlarged perspective view of the peripheral tower panel 112 of the present invention incorporating one embodiment of flow promoter vanes formed in the top surface 113 thereof. The panel 112 is constructed with an angulated transition region 115 which tapers to a flat engagement lip 152 as described above. Partially shown in this view is the underlying lip 156 that provides the above described improved means for support of the panel 112 upon the support ring 154. Lip 156 depends downwardly in the form of a skirt from the curved peripheral edge of the top surface 113. A plurality of louvered apertures 223 are formed in surface 113, which louvered apertures are angulated to provide a specific discharge vector to passage of vapor therethrough. For example, louver 223A is positioned in the region of the panel 112 wherein arrows 126 (as described in FIG. 4) vector the flow of liquid outwardly from the diametral streamline. Louver 223B as shown herein, has a flow vector 128 extending therefrom indicating its direction of discharge parallel to the diametral streamline. Likewise, louver aperture 223C is shown with a flow arrow 130 which is angled toward the diametral streamline as described in FIG. 4. The angle of formation of the individual louvers 223 is critical to the control of the liquid and vapor flow. Although a variety of louver sizes, shapes and forms may be utilized, a coined arcuately shaped louver is shown herein for purposes of illustration. This louver is most clearly shown and described in FIG. 9.

Figure 9:
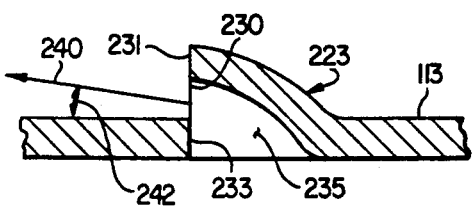
FIG. 9 is an enlarged, side elevational, cross sectional view of the flow promoter louver of FIG. 8 taken along lines 9—9 thereof.

Referring now to FIG. 9, there is shown the louver 223 coined in and upstanding from plate surface 113. The louver forms an opening 230 in the frontal region thereof. Opening 230 is formed by surface 231 being coined from and separated by surface 233 of the plate surface 113. The cavity 235 defined therein is thus vented only through opening 230. Any vapor flow through cavity 235 would thus be channeled through the opening 230 in the direction of discharge arrow 240. The angle of discharge vapor vector 240 relative to the top surface 113 creates an angle 242. Angle 242 may vary depending on the shape and configuration of the louver 223. In the present embodiment, angle 242 is on the order of 30°, which angle has been shown to be effective in the generation of sufficient thrust to the liquid disposed over louver 223 to impart thereto the desired directionality. Changes may, of course, be made in the angle 242 and any angle between 0° and on the order of 60° is contemplated in accordance with the principles of the present invention.

Referring now to FIGS. 4, 8 and 9 in combination, it may be seen that a variety of louver sizes and louver shapes may be incorporated into raised flow promoter panels in accordance with the principles of the present invention. The size and shape of the louver upon the raised panel 113 may be the same as or differ from that of the band 122. Both the size and the density of the louvers will, of course, vary depending on the operational parameters of the tower and the design of the particular louver may be oriented toward a particular tower operation.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. An improved tray assembly for a process column of the type wherein liquid flows downwardly through a first downcomer onto a first tray and across the active area thereof through which vapor flows upwardly for interaction and mass transfer with the liquid before passing therefrom through a discharge downcomer over a weir disposed adjacent thereto, said improvement comprising substantially uniformly raised flow promoter tray panels disposed between said first and discharge downcomers and along select tray active regions for establishing preferential vapor and liquid flow thereacross and wherein said first downcomer is constructed in a chordal section of said process column and a raised active inlet area panel is disposed therebeneath at a height above said tray active panel on the order of the height of said flow promoter tray panels.

2. The apparatus as set forth in claim 1 wherein said raised active inlet area is disposed beneath said first downcomer at a height above said tray active area which is greater than the height of said flow promoter tray panels above said tray active area.

3. The apparatus as set forth in claim 1 wherein said downcomer is constructed in an intermediate section of a second, upper tray for discharging liquid onto an intermediate region of said first tray.

4. The apparatus as set forth in claim 1 wherein said raised active inlet area is disposed beneath said first downcomer at a height above said tray active area which is greater than the height of said flow promoter tray panels above said tray active area and said weir is constructed of a height greater than both the height of said flow promoter tray panels and said raised active inlet area panels.

5. The apparatus as set forth in claim 1 wherein said select tray regions include chordal sections of said tray.

6. The apparatus as set forth in claim 5 wherein said chordal sections are formed of a height less than the height of said weir of said discharge downcomer.

7. An improved tray assembly for a process column of the type wherein liquid flows downwardly through a first downcomer onto a first tray and across the active area thereof through which vapor flows upwardly for interaction and mass transfer with the liquid before passing therefrom through a discharge downcomer over a weir disposed adjacent thereto, said improvement comprising substantially uniformly raised flow promoter tray panels disposed between said first and discharge downcomers and along select tray active regions for establishing preferential vapor and liquid flow thereacross and further including a raised active area beneath said downcomer comprising an inlet panel formed with a plurality of directional vapor flow vanes for imparting directionalized, preferential vapor flow therein relative to said active area of said first tray.

8. The apparatus as set forth in claim 7 wherein said select tray regions include intermediate sections of said tray oriented generally orthogonally to the path of liquid flow thereacross.

9. The apparatus as set forth in claim 7 wherein said inlet panel comprises first and second substantially planar, apertured regions, said first apertured region having flow vanes disposed at an angle relative to flow vanes of said second apertured region.

10. The apparatus as set forth in claim 9 wherein said flow vanes of said first and second apertured regions are oriented generally orthogonally one to the other for imparting vapor flow in generally orthogonal directions therefrom.

11. The apparatus as set forth in claim 10 wherein said active tray area comprises valves adapted to permit the flow of vapor upwardly therethrough and liquid thereacross.

12. An improved method of mixing vapor with liquid discharged from a first downcomer of a process column onto an underlying tray of the type wherein descending liquid mixes with ascending vapor flowing through said tray, said liquid flowing across said tray prior to discharge through a second downcomer, said improvement comprising the steps of providing substantially uniformly raised active tray areas adapted for vapor-liquid flow promotion, securing said raised tray areas between said downcomers in select areas of said tray, imparting preferential vapor flow through said raised tray areas, and injecting said preferential vapor flow into said liquid flowing across said tray for directional liquid flow therefrom.

13. The method as set forth in claim 12 and including the step of constructing said downcomer with a discharge region adapted for providing a dynamic seal against ascending vapor flow.

14. The method as set forth in claim 13 and further including the step of providing a uniformly raised active inlet area panel beneath said downcomer, said panel having a plurality of directional vapor flow vanes therein.

15. The method as set forth in claim 14 and further including the steps of providing first and second inlet panels, each having a plurality of directional flow vanes disposed at different angles one to the other, securing said first and second inlet panels beneath said downcomer, and imparting preferential vapor flow therefrom at different angles.

16. An improved tray for a chemical process tower of the type wherein liquid and vapor flow across and through circular trays disposed within said tower in substantially counter-current directions, the improvement comprising:
said trays being formed with raised panel areas having directional flow vanes for promoting the flow of liquid thereacross in select directions, some of said raised panels being disposed in peripheral regions of said tray to thereby discharge preferential vapor flow into said liquid for subsequent flow in a select direction; and
said raised panel sections further being formed of a substantially uniform height and disposed upwardly from said tray surface to comprise an upstanding portion thereof adapted for affording preferential vapor flow therethrough.

17. The apparatus as defined in claim 16 wherein said flow promoting panels are disposed in opposite chordal portions of said tray for preventing retrograde flow therein.

18. The apparatus set forth in claim 16 wherein said tray is further constructed with a raised active inlet area disposed beneath a downcomer for carrying liquid from a tray disposed thereabove, and said raised flow promoter panels having a height above said tray surface less than the height of said raised active inlet area.

19. The apparatus set forth in claim 16 wherein said flow promoter panels are constructed with a plurality of flow vanes formed therein, said vanes being adapted for imparting a directional vapor flow therefrom, said vapor flow angle being selected for preventing retrograde liquid flowing thereabove.

20. The apparatus set forth in claim 16 wherein said tray further includes at least one flow promoter panel intermediately disposed thereacross, said flow promoter panel being constructed in the form of a raised section disposed across said tray generally perpendicular to the flow of liquid thereon.

21. The apparatus set forth in claim 20 wherein said raised section is constructed of a substantially uniformly raised active area having said directional flow vanes formed therein.

22. An improved method of controlling the flow of liquid across a tray of a chemical process tower of the type wherein vapor and liquid are forced to flow in generally counter-current passage between downcomers coupling said trays, the improvement comprising the steps of:
constructing said tray with a plurality of raised panel sections;
forming said raised panel sections with a plurality of directional flow apertures;
constructing said directional flow apertures along a substantially uniformly raised panel surface outwardly of said downcomer; and
securing said raised panel surfaces in peripheral regions of said tray for imparting uniform liquid flow therein.

23. The method set forth in claim 22 and further including the step of constructing a raised active inlet area beneath said downcomer for carrying liquid from a tray disposed thereabove, and forming said raised flow promoter panel with a height above said tray surface less than the height of said raised active inlet area.

24. The method set forth in claim 22 and including the step of constructing said flow promoter panels with a plurality of flow vanes therein, said vanes being adapted for imparting directional vapor flow therefrom, said vapor flow direction being selected to prevent retrograde liquid flowing thereabove.

25. The method set forth in claim 24 and including the step of securing at least one flow promoter region across said tray generally perpendicular to the flow of liquid thereon.

* * * * *